FIG. 4a
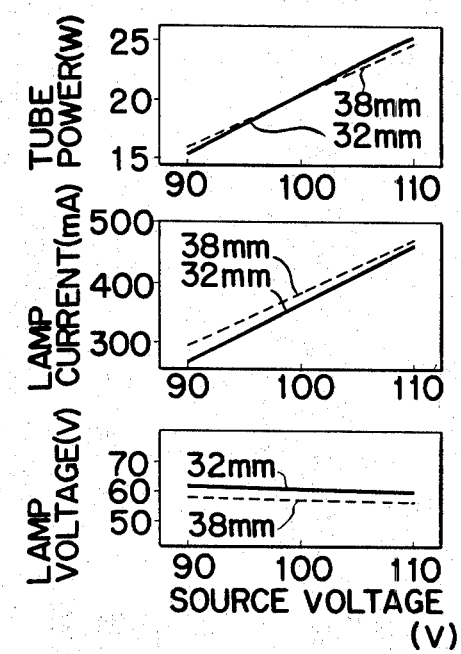
FIG. 4b
FIG. 4c
FIG. 5a
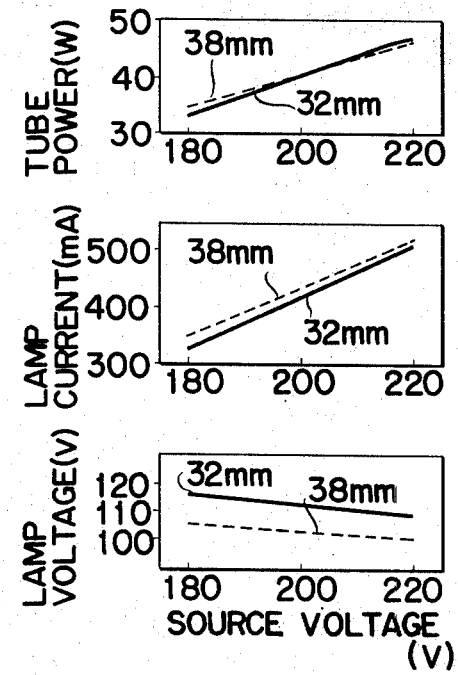
FIG. 5b
FIG. 5c

United States Patent Office 3,546,519
Patented Dec. 8, 1970

3,546,519
FLUORESCENT LAMPS WITH COIL ELECTRODES AND ELECTRODE SUPPORT STRUCTURE
Tsunekazu Hashimoto, Tokyo, Akira Someya, Yokohama-shi, and Teizo Hanada, Saitama-ken, Japan, assignors to Tokyo Shibaura Electric Co., Ltd., Kawasaki-shi, Japan, a corporation of Japan
Filed Aug. 21, 1968, Ser. No. 754,302
Int. Cl. H01j 61/06, 61/12, 61/30
U.S. Cl. 313—109                      5 Claims

ABSTRACT OF THE DISCLOSURE

In a straight type fluorescent lamp having the total length of 400 mm. to 1,500 mm. and exchangeable with conventional lamps including sealed glass tubes of 38 mm. outer diameter, the pressure of the sealed rare gas is selected to a value ranging from 0.5 to 3.2 mm. Hg, preferably from 0.5 to 2.5 mm. Hg for a tube outer diameter of 29 mm., from 0.5 to 2.8 mm. Hg for tube outer diameters ranging from 29 to 32 mm., and 0.5 to 3.2 mm. Hg for tube outer diameters ranging from 32 to 35 mm. to increase the total lumen output. The welds spacing across a sealed coil electrode is selected to a value ranging from 11.4 mm. to 14.5 mm. to decrease the blackening phenomenon.

---

This invention relates to fluorescent lamps and more particularly to improved straight type fluorescent lamps having tube outer diameters of from 29 to 35 mm. and total lengths of from 400 to 1,500 mm.

Straight type fluorescent lamps now widely used in dwelling houses have a rated capacity of 15 to 65 watts, an outer diameter of about 38 mm. and a total length of from about 400 to 1,500 mm. depending upon the rating of the lamp. These lamps have electrodes spaced from about 30 to 40 mm. from their base faces and contain an inert rare gas such as argon sealed at a pressure of about 3 mm. Hg in addition to a small quantity of mercury.

Ratings of fluorescent lamps are determined by IEC (International Electrotechnical Commission) as shown in the following table (See Publication 81, Tubular Fluorescent Lamps for General Lighting Service and Publication 82, Ballasts for Fluorescent Lamps).

fluorescent lamps perfectly interchangeable with presently used fluorescent lamps and having improved light outputs and at least the same or longer operating life with decreased blackening phenomenon.

According to this invention, this object can be attained by providing a straight type fluorescent lamp comprising a light transmissive sealed glass tube, a phosphor layer formed on the inner surface of said glass tube, a quantity of mercury and an inert rare gas sealed in the glass tube, a pair of coiled electrodes including a pair of lead wires or welds sealed at the opposite ends of the glass tube and filaments connected across lead wires, and a pair of bases mounted on the opposite ends of the glass tube and each including a pair of base pins, the total length of said lamp when measured between outer end surfaces of the bases being from 400 mm. to 1,500 mm., characterized in that the outer diameter of the glass tube ranges from 29 to 35 mm., that the pressure of the filling gas is higher than 0.5 mm. Hg but less than 3.2 mm. Hg, preferably from 0.5 mm. Hg to 2.5 mm. Hg for a tube outer diameter of 29 mm., from 0.5 mm. Hg to 2.8 mm. Hg for tube outer diameters between 29 mm. to 32 mm. and from 0.5 mm. to 3.2 mm. Hg for tube outer diameters between 32 mm. and 35 mm. and that the spacing between lead wires of the coil electrode is from 11.4 mm. to 14.5 mm.

The present invention can be more fully understood from the following detailed description when taken in connection with the accompanying drawings, in which.

FIGS. 4a to 4c and FIGS. 5a to 5c are graphs to compare source voltage versus various lamp characteristics of the lamp and the conventional lamp, FIGS. 4a to 4c being for 20 watts and FIGS. 5a to 5c being for 40 watts; and FIGS. 6a to 6d are graphs, showing various characteristics of the fluorescent lamp versus tube outer diameter taking a combination of the argon pressure sealed in the glass tube and the height of the electrodes sealed in the opposite ends of the tube as the parameters.

In order to obtain straight type fluorescent lamps of increased light output and long operating life we have made a number of experiments and analyses. The result of experiments on 40 watt fluorescent lamps regarding various fluorescent lamp characteristics on which the invention is based will be considered with reference to FIGS. 1a to 1d. In these figures, the abscissa represents the pressure of sealed argon gas ranging from 1.0 mm. to 4.0 mm. Hg and the ordinate represents light output (relative value), lamp power (watt), lamp current (milliampere) and lamp

|  | Nominal dimensions, mm. | | Characteristics of reference ballast | | | |
|---|---|---|---|---|---|---|
|  | Length | Diameter | Rated voltage, v. | Reference current, a. | Ratio voltage/current, ohms | Power factor |
| Rated wattage: | | | | | | |
| 20 | 590 | 38 | 127 | 0.37 | 270 | 0.12 |
| 25 | 990 | 38 | 220 | 0.29 | 605 | 0.10 |
| 30 | 910 | 38 | 220 | 0.405 | 460 | 0.10 |
| 40 | 1,200 | 38 | 220 | 0.43 | 390 | 0.10 |
| 65 | 1,500 | 38 | 220 | 0.67 | 240 | 0.10 |

Although these data of fluorescent lamps have been considered appropriate from the standpoint of their manufacturing, convenience of use, efficiency and operating life, it is still desired to increase the light output or total lumen without decreasing the operating life of the lamp. Since fluorescent lamps fabricated under said specification are now widely used, any improved fluorescent lamps should be interchangeable with these conventional lamps. In other words, it is necessary that presently used lighting fixtures might be used for such improved fluorescent lamps.

It is an object of this invention to provide improved voltage (volt), respectively. Outer diameters of glass tubes were 25 mm., 29 mm., 32 mm., 35 mm., 45 mm. and 38 mm. respectively, the last value representing the diameter of presently used fluorescent lamps. The source voltage was 200 volts and the ambient temperature was 20° C. By the term "the relative value of the light output" is meant the ratio to the light output of the presently used fluorescent lamps of 38 mm. tube outer diameter which is taken as 100%.

Figure 1A:
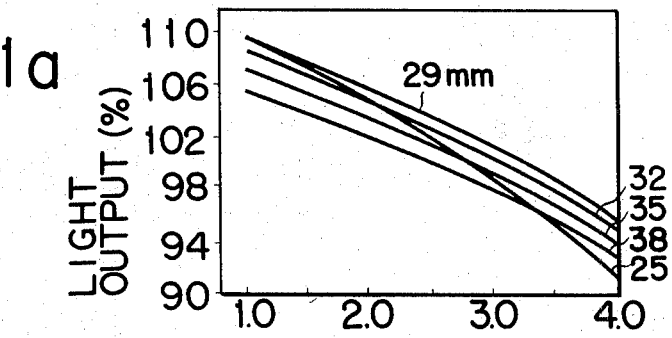
FIGS. 1a to 1d are graphs of sealed argon pressure versus various characteristics of the fluorescent lamp rated at 40 watts, taking the tube outer diameter as the parameter.

As is clearly shown in FIG. 1a, the value of light output is larger for tube outer diameters from 29 mm. to 35 mm. than for a tube outer diameters of 38 mm. throughout the range of argon pressure measured. For tubes of outer diameter of 25 mm., the light output is larger than the tubes of 38 mm. outer diameter in the range less than about 3.5 mm. Hg of argon pressure.

Figure 1B:
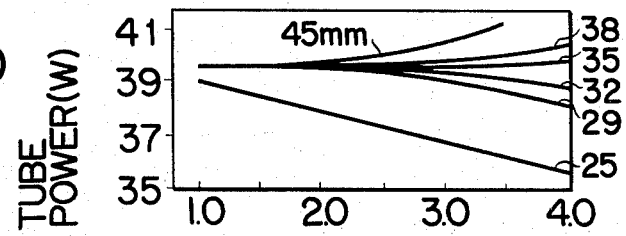

As shown in FIG. 1b, the tube power increases most significantly with the increase of argon pressure for tubes of outer diameter of 45 mm., increases gradually for tubes of outer diameter of 38 mm., while it does not vary in any appreciable amount or decreases gradually for tubes of the outer diameter ranging from 29 to 35 mm. In contrast, in the case of tubes having an outer diameter of 25 mm., the tube power decreases abruptly with increase in the argon pressure and the power does not reach the required value over the entire range of argon pressure measured.

Figure 1C:
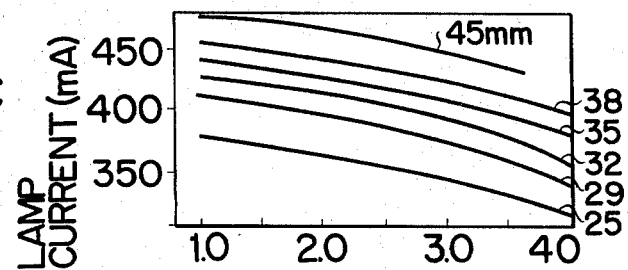

FIG. 1c shows that the lamp current decreases with decrease in the tube outer diameter. For a tube of an outer diameter of 25 mm., the lamp current decreases greatly so that the required lamp power is not consumed as has been discussed in connection with FIG. 1b. Conversely, for a tube of an outer diameter of 45 mm., the lamp current increases greatly so that as shown in FIG. 1c, the lamp power consumed deviates greatly, which means that such tube has no practical value.

Figure 1D:
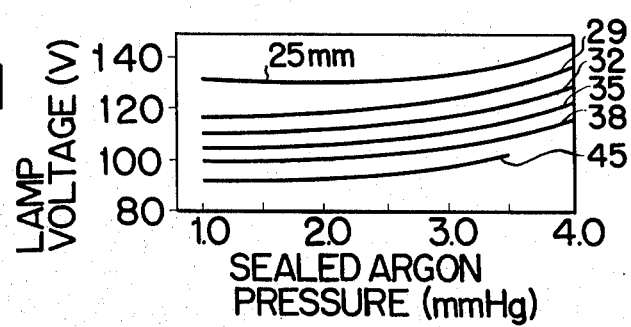

FIG. 1d shows that lamp voltage increases with decrease in the tube outer diameter. With too high lamp voltage, the presently used glow starter has a tendency to operate again during operation of an associated fluorescent lamp so that only tubes having outer diameters more than 29 mm. can be used in actual practice.

Figure 2:
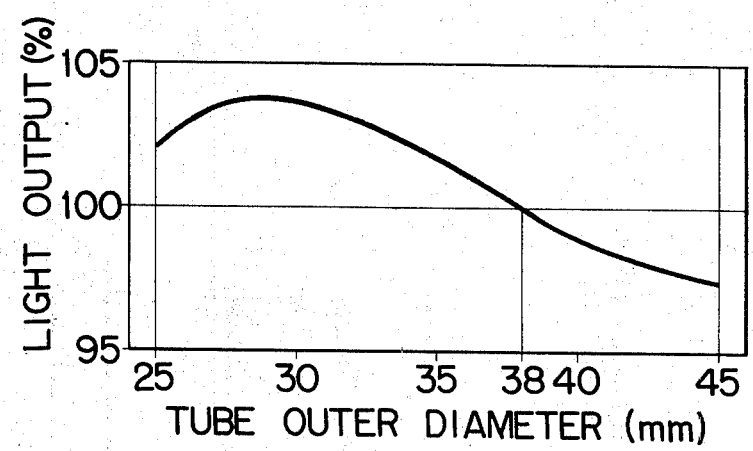
FIG. 2 is a characteristic graph of tube outer diameter versus light output.

FIG. 2 shows the variation in the relative value of light output of fluorescent lamps versus tube outer diameter for a sealed argon pressure of 2.0 mm. Hg. As is evident from this figure the maximum light output can be obtained for a tube outer diameter of 29 mm. and it can be noted that there is a range of tube outer diameter or a range of improved effects around this maximum value in which the light output sufficiently increases beyond that of the presently used lamps having a tube diameter of 38 mm. It was noted that substantially the same light output relative value curve could be obtained for sealed argon pressures other than 2.0 mm. Hg.

Result of another experiment showed that where the sealed argon pressure was lower than 0.5 mm. Hg, increases in the starting voltage, and decreases in the operating efficiency and life are remarkable regardless of the value of tube outer diameter. These undesirable phenomena are well known to one skilled in the art.

Analysis of these results of experiments shows that, in order to provide fluorescent lamps exchangeable with presently used lamps and having increased light output, it is necessary to select the tube outer diameter to a value in a range of from 29 mm. to 35 mm. and to control the sealed rare gas pressure with reference to the tube outer diameter in the following manner without altering the total length of the lamp. More particularly, it was found that these objects could be attained by selecting the sealed rare gas pressure to a value in a range of from 0.5 mm. Hg to 3.2 mm. Hg, preferably to be less than 2.5 mm. Hg for a tube outer diameter of 29 mm., less than 2.8 mm. Hg for tube outer diameters of from 29 mm. to 32 mm. and less than 3.2 mm. Hg for tube outer diameters of from 32 mm. to 35 mm. As the standard wall thickness of glass tubes utilized in fabricating fluorescent lamps equals to 0.8 mm., the inner diameter of the tubes equals to the outer diameter minus twice wall thickness.

The light output of fluorescent lamps with such controlled tube outer diameter and sealed rare gas pressure is greatly improved over that of presently used lamps having an outer diameter of 38 mm., and yet such improved lamps have sufficient interchangeability with conventional lamps. Further, reduction of the tube outer diameter results in such advantages as the reduction of costs of various materials required to fabricate lamps, packing, transportation and storage.

The spacing between welds of coil electrodes of presently utilized fluorescent lamps or the spacing between lead wires clamped to opposite ends of respective ends of electrode coils is about 16 mm. When these coil electrodes were used in fluorescent lamps with tube outer diameters and sealed rare gas pressure which are controlled as above described, it was noted that there was a large tendency of blackening phenomena at the ends of tubes, or of forming anode spots and end bands, thus shortening the operating life of fluorescent lamp. It has also been found that these phenomena are caused by the reduction of the spacing between the inner wall of the tube and electrode coils contained therein so that more materials sputtered from the electrodes are deposited on the tube inner wall when coil electrodes of conventional design are mounted in tubes having outer diameters of from 29 mm. to 35 mm.

We have investigated the relationship between the spacing between welds of coil electrodes and occurrence of the blackening phenomena and found that blackening could be prevented positively by controlling the spacing between welds to a value in a range of from 11.4 mm. to 14.5 mm. Said spacing is represented by the shortest distance between the welds.

Analysis of the result of experiment is as follows:

First, the relationship between electrodes and a discharge space is considered. In a condition (phase) under which an electrode is operating as an anode, electrons in the discharge space flow to the anode. The apparent electrode dimensions with respect to the discharge space are larger for wider welds spacing than narrower welds spacing, so that it may be considered that a sufficiently large number of electrons can flow to the electrode thus decreasing energy loss (anode voltage drop). As a result, the overall efficiency of the lamp is increased by slight decrease in the anode loss. With a narrow welds spacing, the electron current tends to concentrate at the narrow space to locally increase the temperature whereas with a wide welds spacing such a local temperature rise is difficult to occur thius effectively preventing blackening of the tube wall due to evaporation of the electrode material caused by excessive temperature rise.

With regard to the other condition (phase) under which the electrode operates as a cathode, sufficient investigation has not yet been made to establish a concrete theory. However, it may also be considered that larger apparent electrode dimensions would result in lesser energy loss for positively charged ions flowing into the electrode at the negative phase. At the cathode phase, as nearly all positive ions are mainly formed near the cathode spot and flow thereto it is thought that the difference in energy loss caused by the magnitude of the welds spacing is smaller than the case of the anode phase.

Secondly, the relationship between the electrode and the tube wall is considered as follows:

The thermoelectron emissive substance (oxides of alkaline earth metals) and tungsten that comprise the electrode, and nickel forming the welds evaporate from the electrode operating at a high temperature or are sputtered by ion bombardment. Under ordinary conditions, atoms separated from the electrode in this manner have not a sufficiently large energy, so that it is thought that a substantial number of these atoms may come to collide against atoms of the rare gas such as argon or the like sealed in the tube and return back to the surface of the electrode. Remaining atoms alone are deposited on the tube wall near the electrode. The electrode substances deposited on the tube wall form thereon an amalgam with mercury causing blackening. Although atoms evaporated or sputtered from the electrode are located relatively close thereto or they are deposited on the tube wall, the density of such atoms varies greatly from the electrode to the tube wall, it being understood that the density is the highest near the electrode and decreases gradually as the distance therefrom increases, and that substantially no atom is present in the discharge space. Under this condition, the shorter the distance between the electrode and the tube wall, the severer is the movement of the electrode substance from the electrode to the tube wall. Accordingly deposition of the electrode substance on the tube wall becomes easier as the welds spacing increases and the spacing between welds and the tube wall decreases, thus promoting blackening. This results in the loss of more thermoelectron emissive material thus shortening the operating life. Atoms of Ba, Sr, Ca or the like that comprise the thermoelectron emissive material are freed from the electrode and then not only deposited directly on the tube wall but also on the other adjacent portion such as welds by the repulsion of argon atom. Atoms deposited on these other portions are again freed. From this it can be understood that the welds spacing has an indirect effect upon the life of the lamp.

In this manner, the first and the second factors function oppositely. With a welds spacing of about 16 mm. for conventional tubes having an outer diameter of 38 mm., where tubes of an outer diameter of 32 mm. is used, the distance between the tube wall and the electrode decreases to 7 mm. from 10 mm. thus doubling the speed of losing the electrode substance.

Conversely, reduction of the welds spacing results in the first factor, thus increasing the energy loss. Concurrently therewith it becomes difficult to form a coil with a sufficient coil spacing between welds. If in this case, the number of coil turns were reduced, the quantity of the thermoelectron emissive substance would be decreased proportionally, thereby decreasing the effective operating life.

Figure 3:
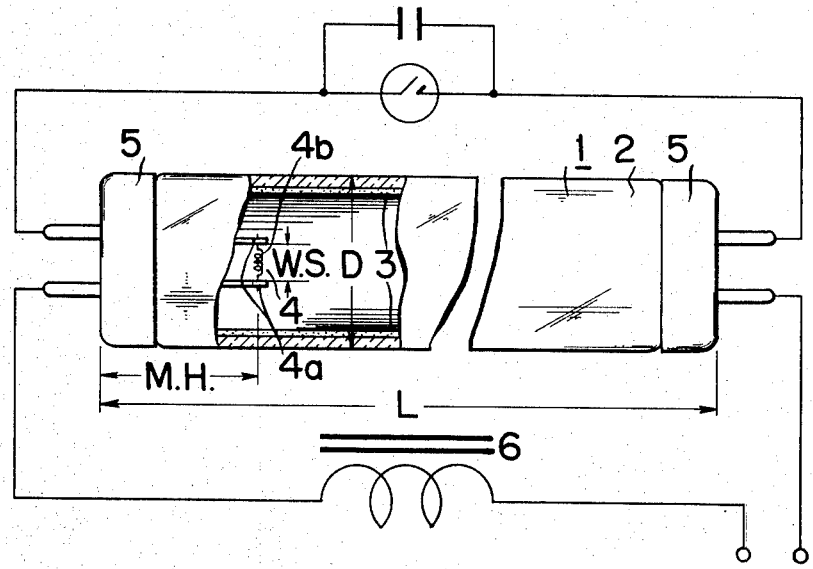
FIG. 3 shows a connection diagram of a fluorescent lamp device utilizing the fluorescent lamp, partly in section.
Figure 6A:
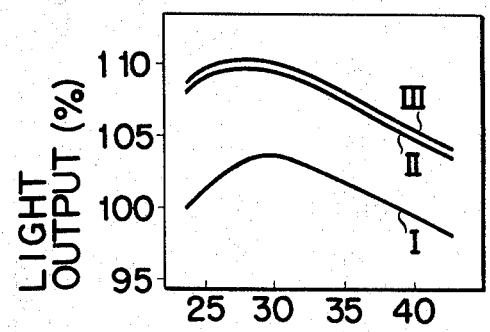
Figure 6B:
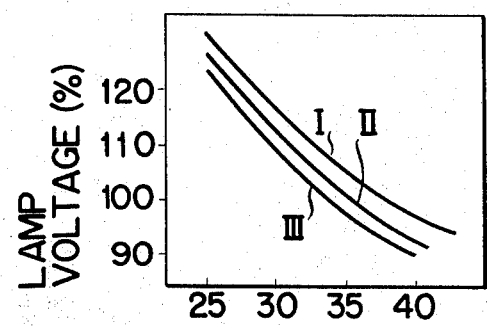
Figure 6C:
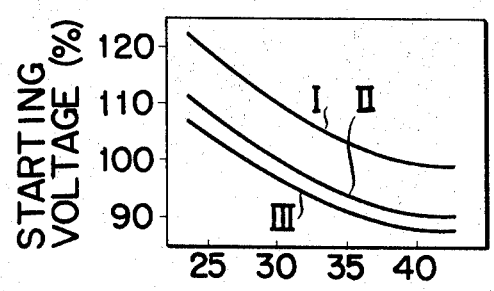
Figure 6D:
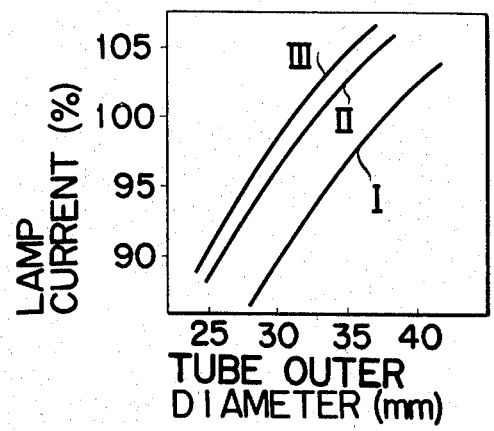

Turning now to FIG. 3, a fluorescent lamp device comprising the fluorescent lamp and a conventional operating circuit will be described. The fluorescent lamp 1 comprises a light transmissive, preferably transparent, sealed glass tube 2 having a tube outer diameter D ranging from 29 mm. to 35 mm. The glass tube is provided with a phosphor layer 3 deposited on the inner surface thereof by a conventional method, coil electrodes 4 sealed in the opposite ends and bases 5 with a pair of pins at the opposite ends, a suitable quantity of mercury and a rare gas being sealed in the glass tube. The total length L between outer end surfaces of bases excluding base pins equals 400 mm. to 1,500 mm. As described hereinabove, the pressure of the sealed gas is selected to a suitable value ranging from 0.5 mm. Hg to 3.2 mm. Hg depending upon the tube outer diameter selected. Each of coil electrodes 4 comprises a pair of lead wires or welds 4a, 4a, a tungsten coiled filament 4b welded or mechanically clamped to the inner ends of the lead wires and an electron emissive substance coated upon the coiled filament. As described above, the spacing between welds is selected to a suitable value in a range of from 11.4 mm. to 14.4 mm. The welds spacing is measured as shown in the figure by W.S.

In the figure, M.H. represents the height at which the coil electrode 4 is mounted, said height being measured from the bottom face of the base 5. The electrode height will be hereinbelow referred to.

When combined with a conventional ballast 6 adapted to be used for a conventional fluorescent lamp of 38 mm. outside diameter of a given rated wattage, a fluorescent lamp of the same rated wattage and having a total length, tube outer diameter, sealed rare gas pressure and welds spacing, all designed to be in the controlled ranges could be used in the ordinary operating circuit which is shown in FIG. 3 as a preheat start type including a glow starter.

In order to have a more perfect understanding of this invention, the following examples are given.

EXAMPLE 1

According to this invention, a fluorescent lamp having a rated wattage of 20 watts was fabricated. The lamp had a total length L of 590 mm. and an outer diameter of glass tube of 32 mm. The electrodes 4 with a welds spacing of 13 mm. were disposed at the opposite ends of the glass tube or at positions spaced 45 mm. from the base faces, and a suitable quantity of mercury and argon of a pressure of 2 mm. Hg were sealed in the glass tube. This fluoroescent lamp was connected to a testing ballast or a choke-coil for a conventional fluorescent lamp of 20 watts and operating tests were carried out to compare this lamp with a conventional 20 w. fluorescent lamp. The result of the test showed that the lamp voltage, starting voltage and the lamp current of the conventional lamp were 50 v., 80 v. and 375 ma., respectively, whereas these values of the lamp were 58 v., 80 v. and 360 ma., respectively. These latter values can be satisfied by the conventional operating apparatus. Light output and lamp efficiency were increased considerably. Thus 1,120 lm. and 56 lm./w. for the conventional lamp were increased to 1,200 lm. and 60 lm./w., respectively. This fluorescent lamp showed no anode spot and end band after operation of 5,000 hours. Thus, the effective life of the lamp is substantially equal to or longer than that of the conventional lamp having an average life of about 5,000 hours and exhibiting an average life of about 7,500 hours under an ideal operating condition. Further fluorescent lamps were fabricated under the same specification as said fluorescent lamp of this invention except that the welds spacing was the same as that of conventional lamps, i.e. 16 mm. Upon testing their operating characteristics it was found that blackening phenomenon was noted after operation of 1,000 to 2,000 hours.

EXAMPLE 2

According to this invention, a fluorescent lamp of a rated wattage of 40 w. was fabricated. This lamp had a total length L of 1,200 mm., and a tube outer diameter of 32 mm., and the electrodes 4 with a welds spacing of 13 mm. were disposed at positions 40 mm. spaced from the base face. A suitable quantity of mercury and argon under a pressure of 2 mm. Hg. was sealed in the glass tube. Operating tests were made on this fluorescent lamp and on the conventional 40 w. fluorescent lamps and it was found that the light output of the lamp was increased to 3,200 lm. from 2,850 lm. of the conventional lamps. With regard to the operating life the same satisfactory result as shown in Example 1 was obtained.

Further fluorescent lamps were favricated under the same specification as the lamp excepting the same welds spacing as conventional lamps or 16 mm. and operating tests were made on these lamps. Similar to 20 w. lamps blackening was noted after operation of 1,000 to 2,000 hours.

Fluorescent lamps of rated wattages of 20 w. and 40 w. shown in Examples 1 and 2 and existing fluorescent lamps of 38 mm. outer diameter were combined with said ballasts, respectively, and various lamp characteristics were comparedby varying the source voltage, the results of comparison being shown in FIGS. 4a to 4c and FIGS. 5a to 5c. As can be clearly noted from these figures, the lamp current of the lamps is slightly less than that of the conventional lamps, this value being substantially equal to that of conventional lamps for varying source voltages except that the lamp voltage increases particularly for 40 w. lamps. Above mentioned rise in the lamp voltage has a tendency to cause undesirable effect for preheat starting utilizing the glow starter. To investigate this effect starting test was made and satisfactory starting characteristics were obtained with a restarting limit voltage of the glow starter over 130 v. for 40 w. lamps for use in 200 v. circuits whereas over 65 v. for 20 w. lamps for use in 100 v. circuits. When considering the facts that as the inoperative limit voltage of the glow starter approaches the lamp voltage, fluorescent lamps become difficult to start and that the source voltage may become lower than the rated value, it is advantageous to select the inoperative limit voltage of the glow starter to be combined with the lamp to a value more than 65% of the rated source voltage.

It was confirmed that the fluorescent lamps could be started at a voltage of 94% of the rated source voltage even when the ambient temperature was 0° C.

As has been described, in order to increase the light output of the fluorescent lamp the tube outer diameter was reduced and the pressure of the sealed rare gas was also reduced than in the conventional lamps, reduction in the tube outer diameter generally accompanies decrease of the lamp current and lamp watts so that design of the lamp may become difficult depending upon the rated wattage of the lamp. Such a tendency is particularly significant in the case of 20 w. lamps, for example. In such a case, the distance between electrodes should also be considered. Reduction of the electrode distance tends to increase the lamp current whereas to decrease the lamp voltage and the starting voltage. In the conventional fluorescent lamps, the height of the electrode as shown in FIG. 3 by M.H. or the distance between the bottom surface or the face of the base and the electrode ranges from 30 mm. to 40 mm. but the design becomes more easy when this distance is selected to a value in a range between 40 to 50 mm., thus readily providing fluorescent lamps perfectly interchangeable with lamps presently used. FIGS. 6a to 6d are graphs showing the outer diameter versus variations (relative values) in the various characteristics of 20 w. fluorescent lamps with varying pressures of sealed argon gas and varying electrode height In these figures, curves I represent characteristics of lamps with a pressure of sealed argon of 3 mm. Hg. and an electrode height of 40 mm., curves II those for a sealed argon pressure of 1.5 mm. Hg. and an electrode height of 40 mm. and curves III those for a sealed argon pressure of 1.5 mm. Hg. and an electrode height of 45 mm. As can be noted from these curves, in the cases represented by curves II and III, the light output is considerably higher, both lamp voltage and starting voltage are lower and the lamp current is larger than the cases represented by curve I. Thus, it will be clear that the light output of the fluorescent lamp is greatly improved while maintaining interchangeability with conventional fluorescent lamps.

Although the invention has been described mainly for fluorescent lamps rated at 20 w. and 40 w., it is not to be restricted to the lamps of said rated wattages but may be carried out for fluorescent lamps rated at 25 w., 30 w. and 65 w.

What is claimed is:

1. In a straight type fluorescent lamp comprising a light transmissive sealed glass tube, a phosphor layer formed on the inner surface of said glass tube, a quantity of mercury and an inert rare gas sealed in said glass tube, a pair of coil electrodes including a pair of welds sealed at the opposite ends of said glass tube and filaments connected between said welds, and a pair of bases with pairs of pins and mounted on the opposite ends of said glass tube, the total length of said lamp measured between outer terminal faces of said bases being from 400 mm. to 1,500 mm., the improvement wherein the outer diameter of said glass tube ranges from 29 to 35 mm., the pressure of said sealed inert gas ranges from 0.5 mm. Hg to 3.2 mm. Hg, and the spacing between welds of said coil electrodes ranges from 11.4 mm. to 14.5 mm.

2. A fluorescent lamp according to claim 1 wherein the outer diameter of said glass tube is 29 mm. and the pressure of said sealed inert gas is higher than 0.5 mm. Hg but less than 2.5 mm. Hg.

3. A fluorescent lamp according to claim 1 wherein the outer diameter of said glass tube ranges from 29 mm. to 32 mm. and the pressure of said sealed inert gas ranges from 0.5 mm. Hg. to 2.8 mm. Hg.

4. A fluorescent lamp according to claim 1 wherein the outer diameter of said glass tube ranges from 32 mm. to 35 mm. and the pressure of said sealed gas ranges from 0.5 mm. Hg to 3.2 mm. Hg.

5. In a straight type fluorescent lamp comprising a light transmissive sealed glass tube, a phosphor layer formed on the inner surface of said glass tube, a quantity of mercury and an inert rare gas sealed in said glass tube, a pair of coil electrodes includes a pair of welds sealed at the opposite ends of said glass tube and filaments connected between said welds, and a pair of bases with pairs of pins and mounted on the opposite ends of said glass tube, the total length of said lamp measured between outer terminal faces of said bases being from 400 mm. to 1,500 mm., the improvement wherein the outer diameter of said glass tube ranges from 29 mm. to 35 mm., the pressure of said sealed inert gas ranges from 0.5 mm. Hg. to 3.2 mm. Hg., the spacing between welds of said electrodes ranges from 11.4 mm. to 14.5 mm. and the height of said electrodes ranges from 40 mm. to 50 mm.

References Cited

UNITED STATES PATENTS

| | | | |
|---|---|---|---|
| 2,258,158 | 10/1941 | Lowry | 313—344 |
| 3,013,169 | 12/1961 | Gungle et al. | 313—109X |
| 3,069,581 | 12/1962 | Lemmers | 313—225X |
| 3,250,943 | 5/1966 | Antonis et al. | 313—344X |
| 3,462,631 | 8/1969 | Hashimoto et al. | 313—220X |

JOHN KOMINSKI, Primary Examiner

P. C. DEMEO, Assistant Examiner

U.S. Cl. X.R.

313—185, 211, 220, 225, 344